Dec. 26, 1944.   F. W. SEYBOLD   2,366,063
AUTOMATIC TRANSMISSION
Filed June 23, 1942    6 Sheets-Sheet 2

INVENTOR.
FREDERICK W. SEYBOLD.
BY
Watson, Cole, Grindle & Watson
ATTORNEY.

Dec. 26, 1944.   F. W. SEYBOLD   2,366,063
AUTOMATIC TRANSMISSION
Filed June 23, 1942   6 Sheets-Sheet 4

INVENTOR.
FREDERICK W. SEYBOLD.
BY Watson, Cole, Grindle & Watson
ATTORNEY.

Dec. 26, 1944.   F. W. SEYBOLD   2,366,063
AUTOMATIC TRANSMISSION
Filed June 23, 1942   6 Sheets-Sheet 5

INVENTOR.
FREDERICK W. SEYBOLD.
BY
Watson, Cole, Grindle & Watson
ATTORNEY.

Dec. 26, 1944.  F. W. SEYBOLD  2,366,063
AUTOMATIC TRANSMISSION
Filed June 23, 1942  6 Sheets-Sheet 6

INVENTOR.
FREDERICK W. SEYBOLD.
BY
Watson, Cole, Grindle & Watson
ATTORNEY.

Patented Dec. 26, 1944

2,366,063

UNITED STATES PATENT OFFICE 2,366,063

AUTOMATIC TRANSMISSION

Frederick W. Seybold, Westfield, N. J.

Application June 23, 1942, Serial No. 448,130

18 Claims. (Cl. 74—189.5)

The present invention relates to automatic variable speed transmissions and particularly to a transmission mechanism or torque converter designed and constructed to vary the speed and torque ratios between the driving and driven members of the power plant of a motor vehicle, although well adapted for use in association with any other mechanism with which variable speed transmissions are customarily employed.

One object of the invention is to provide a power transmission mechanism which has the capacity to pass from a relatively low gear ratio through intermediate gear ratios to the highest gear ratio in an entirely automatic manner and without requiring the attention of an operator. A motor vehicle equipped with the novel transmission, despite such entirely automatic operation, will be at all times under the complete control of its operator who may, if he desires, select and maintain a desired speed transmission ratio regardless of the speed of the car, except when the speed of the car becomes extremely low, when return to the lowest gear ratio is in all cases automatically effected. The transmission is designed to provide for the reversal of motion of the driven shaft relatively to the drive shaft, but only one control element is needed and the same gearing which is employed in transmitting power in the forward direction from the driving to the driven shaft is employed in transmitting power to revolve the driven shaft in reverse.

In automatic transmissions of types heretofore designed or suggested it has been generally considered necessary to employ a separate gear train to transmit power for reverse propulsion of the driven shaft, entirely in addition to the gearing employed in the forward propulsion of the driven shaft. When the novel variable speed transmission is employed in association with the power plant of the motor vehicle, it is particularly advantageous inasmuch as, during both the acceleration and deceleration of the vehicle, the mechanism acts automatically and without sound or shock so that the driver is spared much discomfort. This advantageous result is achieved in large part because of the absence of mechanical clutching and braking elements, which have heretofore been widely used and which cause sudden operative engagements and disengagements which are accompanied by noise and shock. By reason of the absence of such clutching and braking elements the present mechanism is also more durable and long lasting, the wear to which its operative parts are subjected being extremely small.

My transmission includes a fluid coupling, in which the slippage never exceeds 30% under any operating condition and is, under most operating conditions to which the mechanism is subjected, very slight indeed, the coupling thus operating at maximum efficiency, avoiding heat loss and the disadvantage of dissipating kinetic energy whenever the vehicle is brought to a stop. The mechanism is entirely self-lubricating. When made use of as an element of the power plant of a motor vehicle the necessity for the use of a separate and separately driven oil pump to supply the bearings of the motor with oil is eliminated, the transmission including as one of its essential elements a gear pump, the discharge from which may be conducted directly to the bearings of the engine or other bearings requiring lubrication.

A further novel feature of the transmission is the means included to prevent rearward "rolling" of the motor vehicle with which it may be used unless and until its operator actually sets the transmission for rearward drive. This locking means forms an integral part of the mechanism and is so associated with the control element that its action is automatically regulated, a feature of considerable importance and certainly one of great convenience to the motor vehicle operator.

The novel transmission is further characterized by the design of the power and torque transmission gearing in such manner that the output shaft may remain stationary while the input shaft rotates and in which the output shaft may be made to rotate in the opposite direction from that in which the input shaft rotates without necessitating the use of an auxiliary gear set. Again, the transmission has been so designed that the angular velocity of the driven shaft cannot exceed that of the driving shaft, the arrangement being such that motion imparted to the driven shaft when the vehicle is pushed or drawn by another vehicle is transmitted to the driving shaft and thus to the engine, for engine starting purposes. The control is of novel character, comprising a single control lever which is readily accessible to the operator and is used to obtain all speeds, including reverse, and neutral. When the automatic transmission is operated in high gear ratio relative rotation of the various gears which it includes practically ceases, wear being thereby greatly reduced and the noise of operation at high speed being practically eliminated.

The invention includes numerous other novel features of construction the accumulative effect of which is to render it eminently practical and superior in operation to those heretofore designed or suggested. In adapting it, numerous minor changes in the design and arrangement of its component elements may be effected. A preferred form is illustrated in the accompanying drawings in which:

Figure 1:
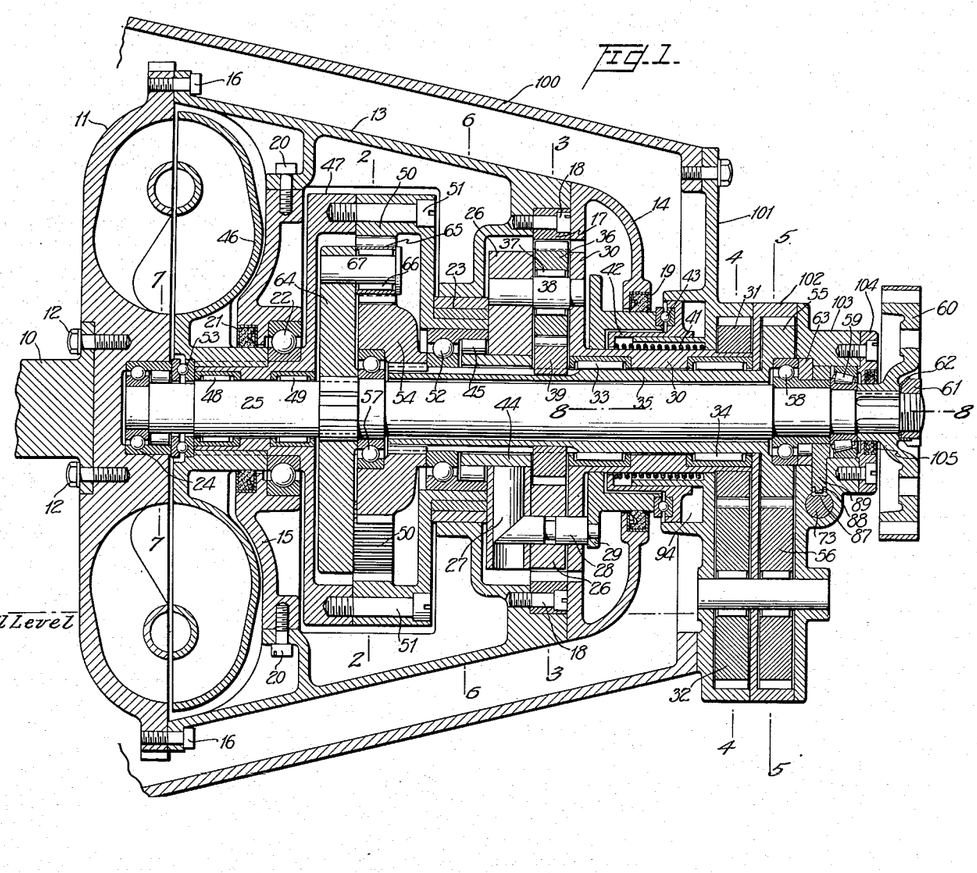
Figure 1 is a vertical longitudinal section, through the power transmission unit.
Figure 2:
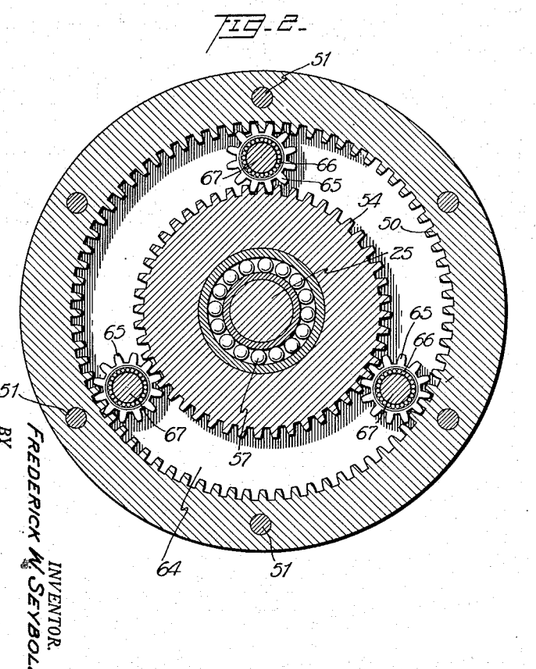
Figure 2 is a transverse sectional view taken along line 2—2 of Figure 1.

Referring to the drawings in detail, and in particular to Figure 1 the transmission can best be described by subdividing it into seven distinct but interconnected assmblies, each of which will now be described in detail.

1. *The driving assembly*

The driving assembly comprises the drive shaft 10 to which is secured the hydraulic impeller 11 by means of the bolts 12. A bell-shaped casing 13 composed of end sections 14 and 15 to facilitate assembly of the transmission gearing is fastened to the impeller 11 by means of the screws 16. An internal ring gear 17 is secured to the casing 13 with the screws 18. The end section 14 is fastened to the casing 13 by means of screws (not shown) and carries an oil seal 19 to prevent leakage of oil from the casing 13.

The other end section 15 is secured to the casing 13 by means of screws 20 and is provided with an oil seal 21 and a ball bearing 22. A bushing 23 is provided for in the casing 13 for a supporting journal of the secondary floating assembly.

A ball bearing 24 is carried by the impeller 11 whose outer race is integral with one member of a one-way clutch device to prevent overrunning of the drive shaft 10 by the driven shaft 25 which is supported by the inner race of the ball bearing 24.

2. *The primary floating assembly*

The primary floating assembly comprises the gear pump casing 26, provided with three radially reciprocatable pistons 27 which co-act with the three grooved pistons 28 which are secured to the flanged sleeve 29. A cover 30 is fastened to the casing 26 by means of screws (not shown) and the former has a long hub to which is fastened the gear 31 which meshes with the gear 32 of the oil pump shown in Figure 4.

Figure 3:
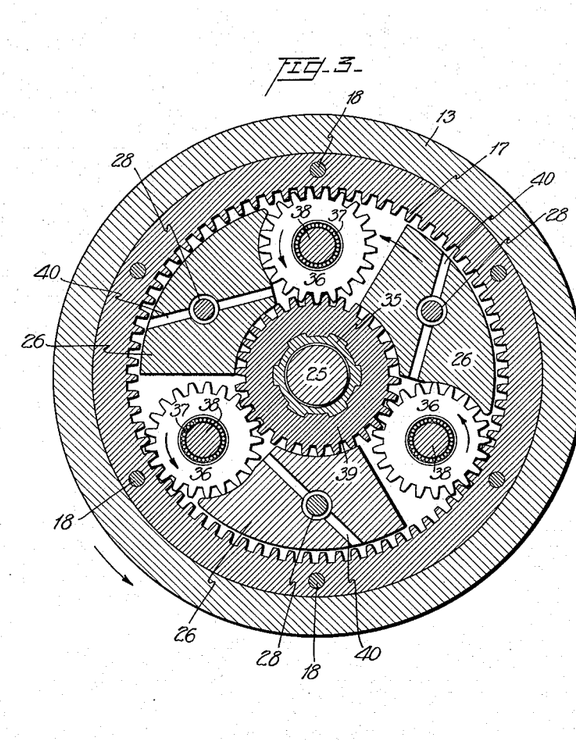
Figure 3 is a transverse sectional view taken along the line 3—3 in Figure 1 showing the planetary gear pump, etc.

The cover 30 is provided with needle bearings 33 and 34 to turn freely on the reaction member 35. Planetary pinions 36 are journalled on needle bearings 37 and the pins 38 carried by the casing 26 and cover 30. The pinions 36 mesh with the internal ring gear 17 and the sun gear 39 of the reaction member 35, thereby forming a gear pump whose discharge through the channels 40 can be completely closed by the movement of the pistons 28 to the right produced by the centrifugal force developed by the pistons 27 in overcoming the pressure of the spring 41 acting against the piston 42 which contacts the flanged sleeve 29 through the ball bearing 43. The one-way clutch member 44 is fastened to the casing 26 and through the rollers 45 is capable of transmitting power to the secondary floating assembly about to be described in detail.

3. *The secondary floating assembly*

The secondary floating assembly consists of the hydraulic runner 46 which is splined to the internal gear flange 47, the latter being journalled on the needle bearings 48 and 49 turning on the driven shaft 25. The internal gear 50 is fastened to the flange 47 by means of the screws 51. The ball bearing 52 journalled on the reaction member 35 has its outer race tight in the hub of the internal gear 50 and the rollers 45 bear against the extended outer race of ball bearing 52 thereby forming a one-way clutch capable of transmitting power from the primary assembly to the secondary assembly. The outside of hub 50 is journalled in the bushing 23 of the casing 13. A thrust bearing 53 bears against the outer race of ball bearing 24 and the runner 46.

4. *The reaction assembly*

Figure 11:
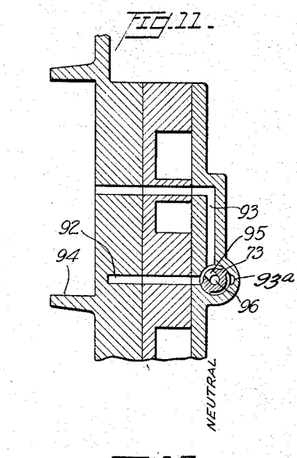
Figure 11 is a vertical section taken along the line 11—11 of Figure 8 showing the valve set for neutral operation of the transmission.

The reaction assembly consists of the previously mentioned long reaction member 35 which on one end is splined to receive the sun gears 39 and 54, and on its other end carries the gear 55 which meshes with the gear 56 of the gear pump shown in Figure 11. A ball bearing 57, supporting the sun gear 54, is mounted on the driven shaft 25 as well as another ball bearing 58, supporting the gear 55.

5. *The driven assembly*

Figure 9:
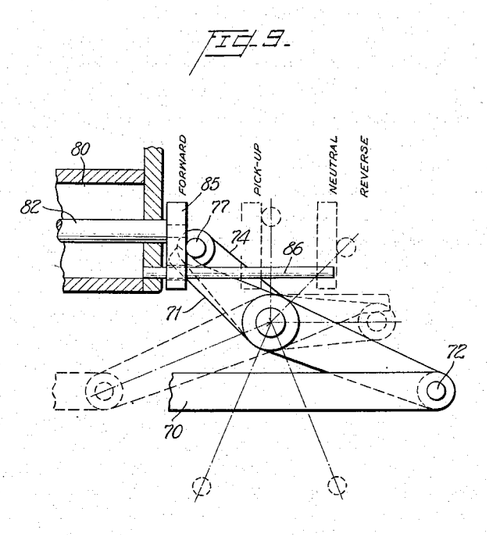
Figure 9 is a side view of the control mechanism linkage, also shown in Figure 8.
Figure 10:
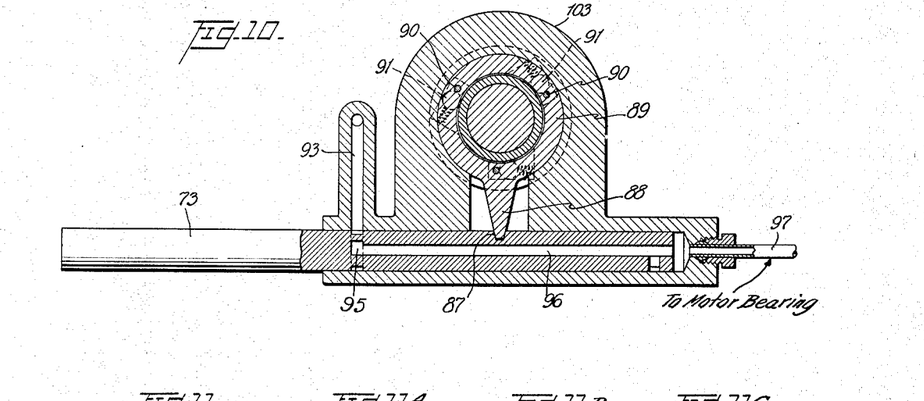
Figure 10 is a transverse vertical section along the line 10—10 of Figure 8.

The driven assembly comprises the driven shaft 25, one end of which is journalled in the ball bearing 24 and the other end in the tapered roller bearing 59 which is mounted in the stationary transmission frame. The extreme right hand end is splined to receive the emergency brake pulley and coupling 60 to which the propeller shaft of the vehicle or other drive connection is attached. The nut 61 and lock washer 62 holds the member 60 securely in place. The ball bearing 58 has an extended inner race which forms a component part of the one-way brake 63 to prevent the rearward motion of the vehicle when the transmission is set in forward position. The spider 64 is secured to the driven shaft 25 and the planetary pinions 65 are free to turn on needle bearings 66 journalled on the headed studs 67 carried by the spider 64. The planetary pinions 65 mesh with the internal gear 50 and the sun gear 54. The outer race of ball bearing 24 is shaped as shown in Figure 9 to form a one-way clutch composed of the rollers 68 and springs 69 to prevent the output shaft 25 from overrunning the driving shaft 10. This one-way clutch is also used for starting the engine by pushing the vehicle, should this become necessary.

6. *The control assembly*

The control assembly consists essentially of two interconnected but separately actuated mechanisms which determine the speed or torque ratio of the transmission.

Figure 8:
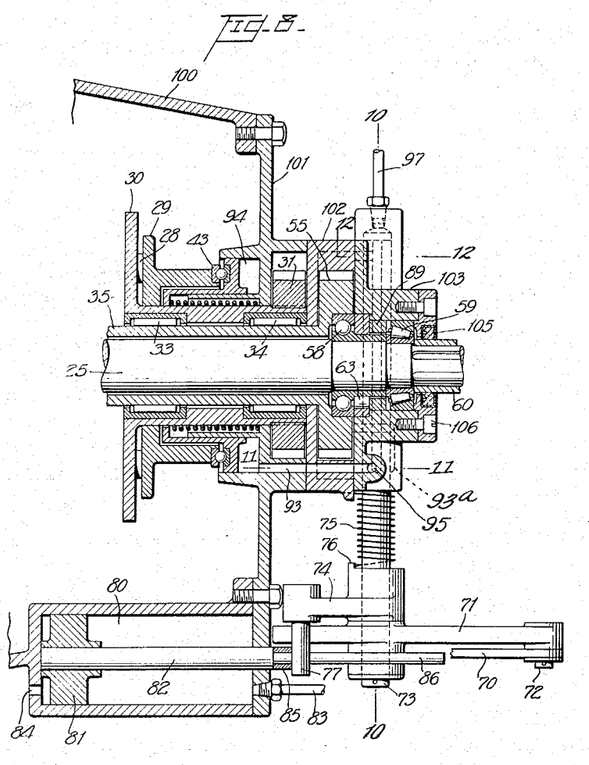
Figure 8 is a top view in horizontal longitudinal section along the line 8—8 of Figure 1, showing the valve actuating and control mechanism.

The first of these two mechanisms consists of a hand lever attached to the steering wheel in the conventional manner whereby the angular movement of this hand lever through a suitable linkage partially indicated by link 70 connected to lever 71 by means of the stud 72 positions the lever 71 for the various speed or torque ratios selected by the operator. The lever 71 is free to turn on the valve rod 73 to one end of which is fastened the lever 74. One end of the torsion spring 75 bears against the lug 76 of lever 74 thereby urging the latter in the direction of maintaining contact with the lever 71 through the pin 77 which is carried by the lever 74. The other end of the torsion spring bears against the stationary transmission frame.

The second mechanism comprises the vacuum cylinder 80 in which the piston 81 is free to reciprocate, actuated by suction from the engine manifold introduced to the cylinder 80 through the pipe line 83. A vent 84 at the opposite end of the cylinder is provided to permit quick return of the piston 81. The piston rod 82 is provided with a head 85 which is guided on the rod 86. The head 85 bears against the pin 77 of lever 74 whereby a forward motion of the piston 81 turns the valve rod 73 against the resistance of the torsion spring 75. The valve rod 73 is provided with a helical groove 87 which cooperates with the tail 88 of the collar 89 which is journalled in the transmission frame and the pins 90 will release the rollers 91 of the one-way brake 63 when the collar 89 is rotated in a counter-clockwise direction to permit operation of the driven shaft in the reverse direction.

Figure 4:
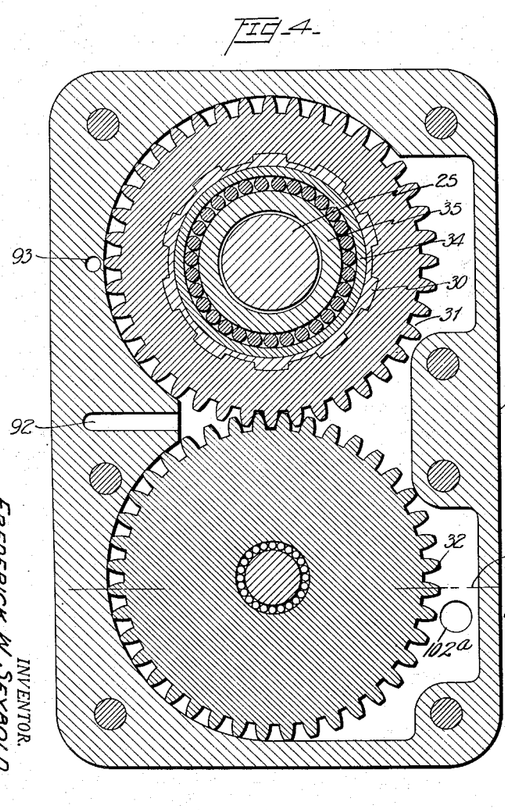
Figure 4 is a vertical sectional view taken along line 4—4 of Figure 1.
Figure 5:
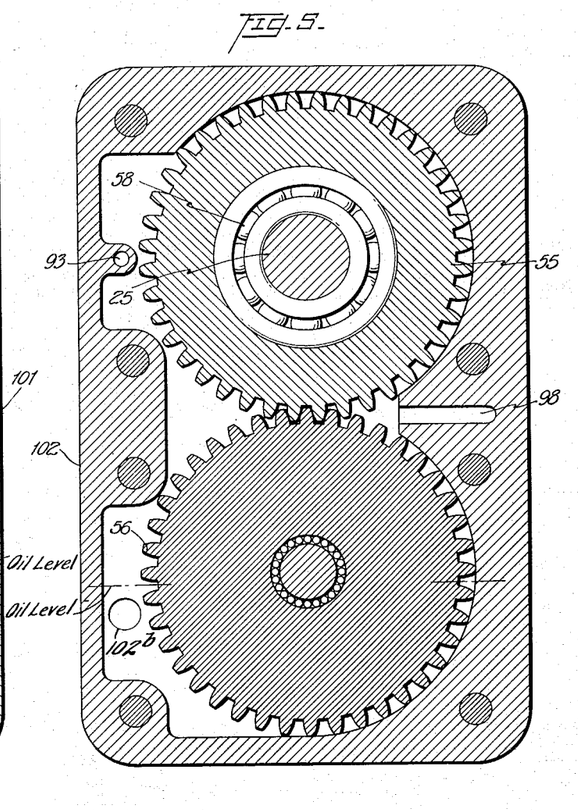
Figure 5 is a vertical sectional view taken along the line 5—5 of Figure 1.
Figures 6, 7, 13:
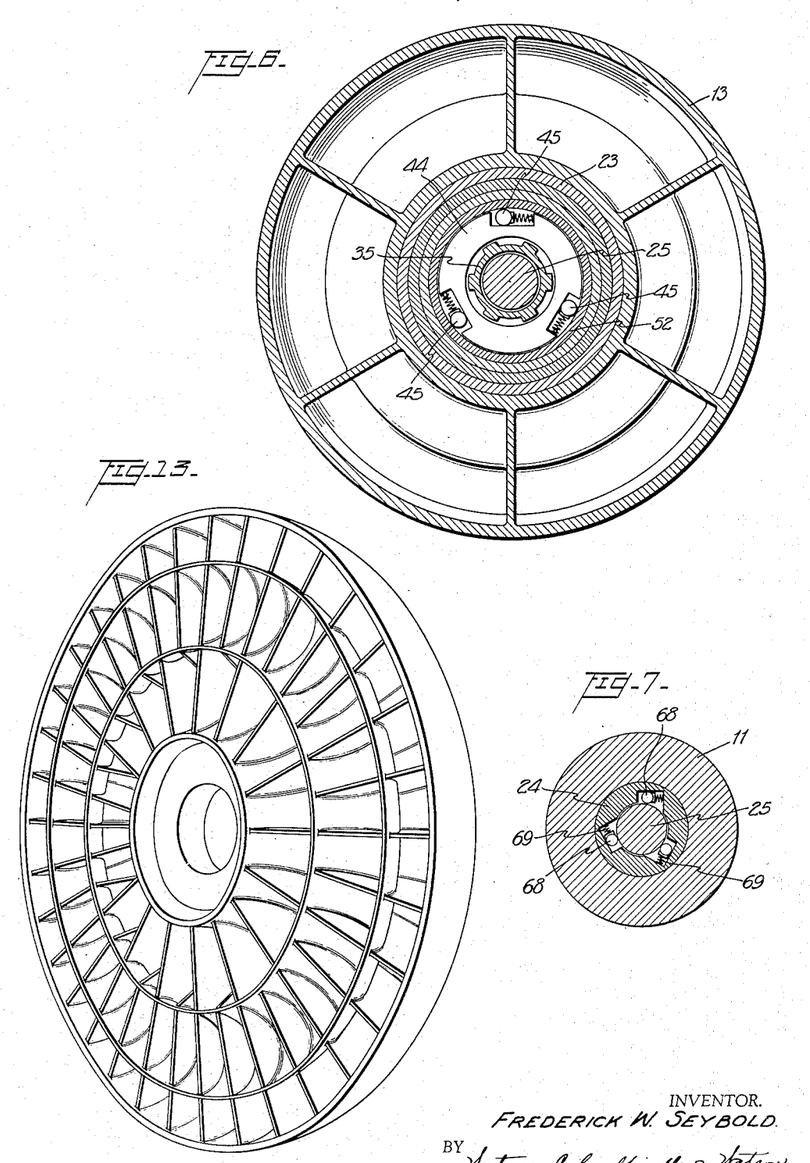
Figure 6 is a vertical sectional view taken along the line 6—6 of Figure 1.
Figure 7 is a vertical sectional view taken along line 7—7 of Figure 1 showing the one-way brake to prevent overrunning of the output shaft.
Figure 13 is a view of the general construction of a Föttinger hydraulic impeller or runner.
Figure 11A:
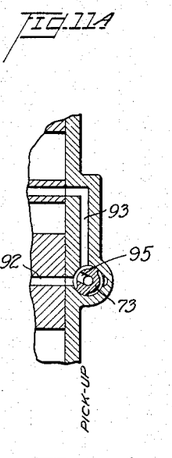
Figures 11A, 11B, and 11C are vertical sections taken along the line 11—11 of Figure 8 showing the valve setting for pick-up, forward and reverse operation of the transmission respectively.
Figure 11B:
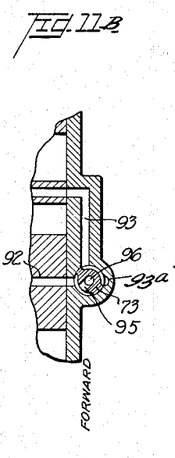
Figure 11C:
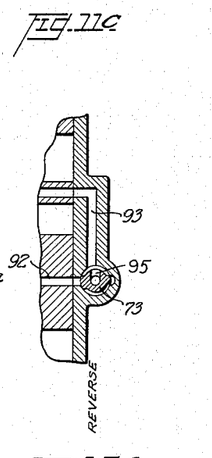

The main function of the valve rod 73 is to control the discharge of the two gear pumps shown in Figures 4 and 5. The oil discharged by the gear set 31 and 32 enters the channel 92 and unless this channel is closed as shown in Figure 11C will flow in two directions, namely through the channel 93 into the cylinder 94 and through the hole 95 in the valve rod 73 and its axial bore 96 to the pipe 97 which distributes the oil to the various lubricating points of the engine.

The pressure of the oil entering the cylinder 94 will force the piston 42 outwardly and through ball bearing 43 acting on the flanged sleeve 29 and pistons 28 the pistons 27 will be forced inwardly, i. e., the discharge ports 40 will remain open.

The oil discharged by the gear set 55 and 56 enters the channel 98 and unless closed by the valve rod 73 will also be discharged as indicated above. When the channel 98 is closed the rotation of the gears 55 and 56 must cease and thereby enables the gears 39 and 54 to take the torque reaction of the transmission in low and intermediate gear ratios. A leakage duct or by-pass 93a (Figures 8 and 11) permits oil to escape from chamber 94 when the valve is turned to the position in which it is shown in Figure 11B.

When the channel 92 is closed the rotation of gear 31 and 32, i. e., the entire primary assembly must cease thereby causing the reaction assembly to rotate in the opposite direction at a higher speed than that of the driving members 17 and 50 with the net resultant rotation of the driven member 25 being opposite to that of the driving member, i. e., the vehicle will then operate in reverse.

7. *The transmission casing*

The transmission casing consists of five sections. The section 100 which is essentially a hollow truncated cone, surrounding the transmission, is bolted at the left hand end to the engine crank case (not shown) and is covered at the right hand end by the section 101 in which the cylinder 94 as well as the chambers for the pump gears 31 and 32 are provided. Suitably secured to section 101 is gear pump casing 102 in which the pump gears 55 and 56 operate. The cover 103 is bolted to casing 102 and the roller bearing 59 is journalled in this cover as well as the collar 89 for releasing the one-way brake rollers 91. The outer member of the one-way brake 63 is tight in cover 103 and the inner member is formed by an extension of the inner race of ball bearing 58 which is tight on output shaft 25.

The roller bearing retaining collar 104 is fastened to cover 103 by means of the screws 106 and the oil seal 105 is pressed into the retaining collar 104 to prevent leakage of oil from the transmission casing. The casing 100 is oil-tight and oil normally stands therein at about the level indicated by the chain line to be seen in Figure 1. In any case the oil level should not fall below the openings which bring the interiors of the gear pump housings into communication with the interior of casing 100. Openings for the transmission of oil to the gear pumps are indicated at 102a and 102b (Figures 4 and 5).

OPERATION

A. *Idling or "neutral" position*

To cause the transmission unit to operate in the idling or "neutral" position, whereby no power from the engine crank shaft 10 will be transmitted to the driven shaft 25, it is assumed that the brakes are applied whereby to lock the axles of the car and the control lever on the steering post has been set in "neutral" position.

Figure 12:
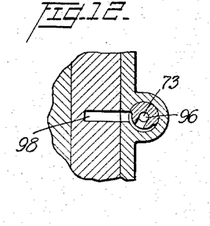
Figure 12 is a vertical section taken along the line 12—12 of Figure 8 showing the valve setting for neutral operation of the transmission.

In this position the valve rod 73 is as shown in Figures 11 and 12, permitting free discharge of oil from both sets of gear pumps 31, 32 and 55, 56. In this idling speed the runner 46 will approximately attain the same speed as that of the impeller 11 and as the spider 64 is locked the sun gear 54 rotates in opposite direction to that of internal gear 50 and at a speed of 72/48—1.5 times that of internal gear 50. The gear ratios taken from the drawings, are given only as an example to illustrate and may be varied to suit different conditions.

The sun gear 39 being integral with the sun gear 54 rotates, of course, at the same speed and direction.

The pump casing 26, i. e., the entire primary assembly will then rotate at a speed of $$\frac{72-1.5\times 30}{72+30}=\frac{27}{102}=.264$$

times that of the driving shaft 10 and in the same direction.

While the car is in "neutral" position the engine may be run at any speed for warming up and the car will not move forward (on level ground) or backward even if the brakes are released.

B. *Forward motion in "low" gear*

To make the car move forward set the control lever to the "forward" position while the engine is idling and the high vacuum in cylinder 80 will keep the valve rod in the "neutral" setting even though the lever 71 is now in the "forward" position. The piston 81 by means of head 85 will act on the pin 77 of the lever 74 and thereby prevent the torsion spring 75 from turning the valve rod 73 into the "forward" position.

Figure 12A:
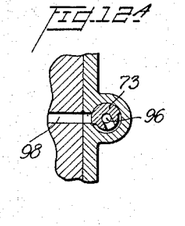
Figures 12A, 12B, and 12C are also vertical sections taken along the line 12—12 of Figure 8 showing the valve positions respectively for pick-up, forward and reverse operation of the transmission.
Figure 12B:
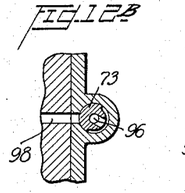

If now the engine is accelerated the vacuum in the cylinder 80 will decrease and the spring 75 will turn valve rod into the forward position as shown in Figures 11B and 12B, the discharge 98 of the pump gears 55 and 56 being completely closed, thereby stalling the entire reaction assembly consisting of the two sun gears 39 and 54. As the torque of spider 64 may be too large to be carried by the runner 46 the latter will slow down, and the flow of power from the drive shaft 10 will be to the internal gear 17, resulting in driving of the primary floating assembly at a speed of $$\frac{72}{(72+30)} = .706$$

times that of the drive shaft 10 in the same direction. The power is now transmitted to the secondary floating assembly consisting of the internal gear 50 and runner 46 through the overrunning clutch 44, 45 to the outer race of ball bearing 52 the latter being tight in the hub of internal gear 50, driving the spider 64 at a speed of $$.706 \times \frac{72}{72+48} = .423$$

times the speed of the drive shaft 10. The output shaft torque is now $$\frac{1}{.423}$$

or 2.36 times greater than the input torque.

C. *Forward motion in "intermediate" gear*

As the engine and car speed increase the torque developed in the fluid coupling will also increase and will become sufficiently great to take over the drive entirely, i. e., the speed of the runner will be in excess of .706 times that of the drive shaft 10 and will approach approximately a value .96 to .98 times that of drive shaft 10. The internal gear 50 will then overrun the primary assembly, this being possible by the construction of the overrunning clutch 44, 45, and outer race of ball bearing 52.

The speed ratio is now $$\frac{72}{72+48} = .600$$

times that of the drive shaft 10 and the output torque is $$\frac{1}{.6} = 1.67$$

times the input torque.

D. *Forward motion in "high" gear*

As the engine and car speed increase still further, the centrifugal force acting on the pistons 27 will increase to such an extent that it will overcome the spring pressure 41 acting on the flanged sleeve 29 and move it to the right closing the discharge ports of the gear pump formed by the gears 36 and 39 and thereby compelling the reaction assembly to rotate in the same direction and speed as that of the drive shaft 10. Consequently the spider 64 will rotate also at approximately the same speed as shaft 10 because sun gear 54, the primary assembly and the secondary assembly now all rotate at the same speed as the drive shaft 10. The output torque is now equal to the input torque (neglecting small friction losses). Planetary action of the gearing has practically ceased thereby reducing wear and noise to a minimum. The oil which the pump gears 31 and 32 discharge under pressure into the pipe 97 serves to lubricate the various bearings, etc., of the engine.

E. *Forward motion in "pick-up" gear*

If for any reason it would be desirable to continue operation of the transmission in "intermediate" gear to provide quick acceleration for passing another car or for climbing a steep hill, a "pick-up" position for the control lever has been provided. When this lever is set in pick-up position, the valve rod 73 is set as shown in Figures 11A and 12A. Oil pressure will now become available and enter channel 93 into the cylinder 94 to act on piston 42 moving flanged sleeve 29 to the left and open the discharge ports of gear pump 36—39 of the primary floating assembly, the reaction assembly will become stalled and the transmission will operate in the "intermediate" gear position (torque conditions permitting) regardless of the engine speed.

Should the torque become so large that the runner 46 slows down and cannot carry the load, the transmission will automatically return to the "low" gear operation without moving the control lever, power then being transmitted from the drive shaft 10 to internal gear 17, to the primary floating assembly, through the overrunning clutch 44, 45, 52 to the secondary floating assembly to the output shaft 25. As soon as torque conditions again permit the transmission will automatically return to "intermediate" gear operation. As the car is slowed down to a stop, the accelerator is returned to the idling position and when the vacuum in cylinder 80 is sufficient it will overcome the spring 75 and return the valve rod 73 to "neutral" setting even though the control lever is still set for "forward" operation. By this method no further manipulation on the part of the driver is required except to operate the brakes and the accelerator for stopping and starting respectively.

F. *Reverse operation*

Figure 12C:
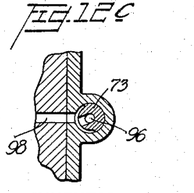

To put the transmission in reverse, the control lever is moved into the "reverse" position, and the valve rod 73 will have the setting as shown in Figures 11C and 12C. The discharge from the channel 92, i. e., the gear pump connected to the primary assembly, is completely closed, thereby stalling the latter and causing the sun gear 39 of the reaction assembly to rotate at a speed of $$\frac{72}{30} = 2.4$$

times that of the drive shaft 10 in the opposite direction. The oil pumped by the pump gears 55 and 56 is discharged through the channel 98 into the bore 96 of the valve rod 73 into the pipe 97 to lubricate the engine during reverse operation.

The internal gear 50 of the secondary floating assembly is driven by the runner 46 and will attain practically the same speed as that of the driver 11 or 10.

The spider 64, therefore, receives motion from the sun gear 54 as well as from the internal gear 50, the net motion being $$\frac{-48 \times 2.4}{72+48} + \frac{72}{72+48} = \frac{-115.2+72}{120} = -.360$$

times that of the drive shaft 10, i. e., in the opposite direction and the output torque in reverse is $$\frac{1}{.360}$$

or 2.78 times the input torque.

When the valve rod 73 is turned from neutral to reverse the rollers 91 of the one-way brake become unlocked by the rotation of the pins 90 in the collar 89 whose tail 88 projects in a helical groove 87 of the valve rod 73, thereby permitting reverse operation of driven shaft 25.

The torque and speed ratios demonstrated correspond closely to those now found on present day cars having manual shift transmissions, but it should be understood that these ratios may be varied to suit particular operating conditions.

Having thus described the invention, what is claimed as new and desired to be secured by Letters Patent is:

1. A variable speed transmission comprising, a drive shaft, a driven shaft, a fluid impeller connected to the drive shaft to be rotated thereby, a runner positioned to be driven by fluid energized by the impeller, a reaction member mounted for rotation about the axis of the driven shaft, control means including a fluid pump and valve for locking said member against rotation or releasing the same, an internal gear operatively connected to the runner, and planetary gearing connecting the reaction member and internal gear, said planetary gearing transmitting driving torque from the internal gear to the driven shaft when said reaction member is locked against rotation, and revolving the reaction member idly when said member is released by said control means.

2. A variable speed transmission comprising, a drive shaft, a driven shaft, a fluid impeller connected to the drive shaft to be rotated thereby, a runner positioned to be driven by fluid energized by the impeller, a reaction member mounted for rotation about the axis of the driven shaft, a duct leading to a bearing to be lubricated, control means including a fluid pump and a valve for regulating the discharge thereof, for locking said member against rotation or releasing the same, the pump discharge port being connected to said duct so that the pump output passes into said duct when the said valve is open, an internal gear operatively connected to the runner, and planetary gearing connecting the reaction member and internal gear, said planetary gearing transmitting driving torque from the internal gear to the driven shaft when said reaction member is locked against rotation, and revolving the reaction member idly when said member is released by said control means.

3. A variable speed transmission comprising in combination, a drive shaft, a driven shaft, a reaction member, including first and second sun gears mounted for rotation about the axis of the driven shaft, first and second internal gears encircling said sun gears, respectively, a hydraulic coupling connection between the first internal gear and the driving shaft, means connecting the second internal gear and the drive shaft, planetary gears attached to the driven shaft and meshing with the first sun gear and first internal gear, planetary gearing meshing with the second sun and internal gears, and means including a clutch for automatically connecting the second planetary gearing to the first internal gear when the angular velocity of the second planetary gearing is greater than the angular velocity of the first internal gear.

4. The combination set forth in claim 3 in which speed responsive mechanism is provided to lock the second internal and sun gears together for simultaneous rotation when the angular velocity of the second planetary gearing about the driven shaft exceeds a predetermined minimum, thus causing the driven shaft to rotate at approximately the angular velocity of the drive shaft.

5. The combination set forth in claim 3 in which each of said second planetary gears comprises the operating element of a fluid pump for circulating fluid along an endless path and in which centrifugally actuated valve means is provided for controlling the flow of fluid along such path.

6. The combination set forth in claim 3 in which means is provided for preventing the driven shaft from rotating in a direction the reverse of the direction of rotation of the drive shaft, and an element connecting said means and said valve whereby said means is rendered inoperative when the valve is set for reverse operation of the mechanism.

7. A variable speed transmission comprising in combination, a drive shaft, a driven shaft, a reaction member, including first and second sun gears mounted for rotation about the axis of the driven shaft, first and second internal gears encircling said sun gears, respectively connected to the runner and drive impeller of a hydraulic coupling, planetary gears attached to the driven shaft and meshing with the first sun gear and first internal gear, planetary gearing meshing with the second sun and internal gears, and means including a clutch for automatically connecting the second planetary gearing to the first internal gear when the angular velocity of the second planetary gearing is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valve to interrupt flow through said ducts and thereby lock the planetary gears against rotation about their axes, causing the driven shaft to rotate at approximately the angular velocity of the drive shaft.

8. A variable speed transmission comprising in combination, a drive shaft, a driven shaft, a reaction member, including first and second sun gears mounted for rotation about the axis of the driven shaft, a first fluid pump and valve for locking said member against rotation, or releasing the same, first and second internal gears encircling said sun gears, respectively connected to the runner and drive impeller of an hydraulic coupling, a first planetary gear set attached to the driven shaft and meshing with the first sun gear and first internal gear, a second planetary gear set meshing with the second sun and internal gears, a second fluid pump connected to the second planetary gear set, a duct leading to one or more bearings and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and thereby lock the planetary gears against rotation about their axes, causing the driven shaft to rotate at approximately the angular velocity of the drive shaft.

9. In a variable speed transmission, in combination, driving and driven shafts, a first internal gear rigidly connected to the driving shaft, a multiple sun gear reaction member mounted for rotation about the axis of the driven shaft, a hydraulic coupling connection between the driving shaft and a second internal gear, a first planetary gear set meshing with the first internal gear and one of the sun gears, a second planetary gear set connected to the driven shaft and meshing with another sun gear of the reaction member and the second internal gear, control means including a fluid pump and valve for locking said first planetary gear set against rotation or releasing the same, whereby to cause the driven shaft to rotate in a direction opposite to the drive shaft.

10. In a variable speed transmission, in combination, driving and driven shafts, a first internal gear rigidly connected to the driving shaft, a multiple sun gear reaction member mounted for rotation about the axis of the driven shaft, a hydraulic coupling connection between the driving shaft and a second internal gear, a first planetary gear set meshing with the first internal gear and one of the sun gears, a second planetary gear set connected to the driven shaft and meshing with another sun gear of the reaction member and the second internal gear, and means to prevent rotation of the driven shaft opposite to the drive shaft, control means including a fluid pump and valve for locking said first planetary gear set against rotation or releasing the same, and an element actuated by said valve to disengage said first means to permit the driven shaft to rotate in a direction opposite to the driving shaft.

11. A variable speed transmission comprising in combination, a drive shaft, a driven shaft, a reaction member, including first and second sun gears mounted for rotation about the axis of the driven shaft, control means including a fluid pump and valve for locking said reaction member against rotation in one direction or releasing the same, first and second internal gears encircling said sun gears, respectively connected to the runner and drive impeller of an hydraulic coupling, a first planetary gear set attached to the driven shaft and meshing with the first sun gear and first internal gear, a second planetary gear set meshing with the second sun and internal gears, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and means for opposing the action of the centrifugal means to prevent locking of the second planetary gear set or unlocking the same.

12. A variable speed transmission comprising in combination, a drive shaft, a driven shaft, a reaction member, including first and second sun gears mounted for rotation about the axis of the driven shaft, control means including a fluid pump and valve for locking said reaction member against rotation in one direction or releasing the same, first and second internal gears encircling said sun gears, respectively connected to the runner and drive impeller of a hydraulic coupling, a first planetary gear set attached to the driven shaft and meshing with the first sun gear and first internal gear, a second planetary gear set meshing with the second sun and internal gears, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and hydraulic means for opposing the action of the centrifugal means to prevent locking of the second planetary gear set or unlocking the same.

13. A variable speed transmission comprising in combination, a drive shaft, a driven shaft, a reaction member, including first and second sun gears mounted for rotation about the axis of the driven shaft, control means including a fluid pump and valve for locking said reaction member against rotation in one direction or releasing the same, first and second internal gears encircling said sun gears, respectively connected to the runner and drive impeller of a hydraulic coupling, a first planetary gear set attached to the driven shaft and meshing with the first sun gear and first internal gear, a second planetary gear set meshing with the second sun and internal gears, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and means for opposing the action of the centrifugal means to prevent locking of the second planetary gear set or unlocking the same, and manual means to position said valve to vary the speed ratio of the transmission.

14. A variable speed transmission comprising in combination, a drive shaft, a driven shaft, a reaction member, including first and second sun gears mounted for rotation about the axis of the driven shaft, a first fluid pump and valve for locking said member against rotation, and vacuum means for releasing the same, first and second internal gears encircling said sun gears, respectively connected to the runner and drive impeller of a hydraulic coupling, a first planetary gear set attached to the driven shaft and meshing with the first sun gear and first internal gear, a second planetary gear set meshing with the second sun and internal gears, a second fluid pump connected to the second planetary gear set, a duct leading to one or more bearings, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and thereby lock the planetary gears against rotation about their axes, causing the driven shaft to rotate at approximately the angular velocity of the drive shaft.

15. A variable speed transmission comprising in combination, a drive shaft, a driven shaft, a reaction member, including first and second sun gears mounted for rotation about the axis of the driven shaft, a first fluid pump and valve for locking said member against rotation, and vacuum means for releasing the same, torque means on said valve to oppose said vacuum means and manual means to position said valve for forward, intermediate, neutral or reverse operation, first and second internal gears encircling said sun gears, respectively connected to the runner and driver impeller of a hydraulic coupling, a first planetary gear set attached to the driven shaft and meshing with the first sun gear and first internal gear, a second planetary gear set meshing with the second sun and internal gears, a second fluid pump connected to the second planetary gear set, a duct leading to one or more bearings, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and thereby lock the planetary gears against rotation about their axes, causing the driven shaft to rotate at approximately the angular velocity of the drive shaft.

16. A variable speed transmission comprising, a drive shaft, a driven shaft, a fluid impeller connected to the drive shaft to be rotated thereby, a runner positioned to be driven by fluid energized by the impeller, a reaction member mounted for rotation about the axis of the driven shaft, control means including a fluid pump and valve for locking said member against rotation or releasing the same, an internal gear operatively connected to the runner, and planetary gearing connecting the reaction member and the internal gear, said planetary gearing transmitting driving torque from the internal gear to the driven shaft when said reaction member is locked against rotation and means to prevent the driven shaft from overrunning the drive shaft.

17. A variable speed transmission comprising in combination, a drive shaft, a driven shaft, a reaction member, including first and second sun gears mounted for rotation about the axis of the driven shaft, means for locking said reaction member against rotation in one direction or releasing the same, first and second internal gears encircling said sun gears, respectively connected to the runner and drive impeller of a hydraulic coupling, a first planetary gear set attached to the driven shaft and meshing with the first sun gear and first internal gear, a second planetary gear set meshing with the second sun and internal gears, and means including a clutch for automatically connecting the second planetary gear set to the first internal gear when the angular velocity of the second planetary gear set is greater than the angular velocity of the first internal gear and means to decrease and stop the relative rotation of the second planetary gear set with respect to the first internal gear.

18. A variable speed transmission comprising in combination, a drive shaft, a driven shaft, a reaction member, including first and second sun gears mounted for rotation about the axis of the driven shaft, means for locking said reaction member against rotation in one direction or releasing the same, first and second internal gears encircling said sun gears, respectively connected to the runner and drive impeller of a hydraulic coupling, a first planetary gear set attached to the driven shaft and meshing with the first sun gear and first internal gear, a second planetary gear set meshing with the second sun and internal gears, and means including a clutch for automatically connecting the second planetary gear set to the first internal gear when the angular velocity of the second planetary gear set is greater than the angular velocity of the first internal gear and means defining in association with the second internal and sun gears a plurality of endless fluid circulation ducts, one for each planetary gear, the planetary gears and sun gear cooperating to pump liquid through said ducts as the internal and sun gears relatively rotate, a fluid flow control valve in each duct, and centrifugal means for actuating said control valves to interrupt flow through said ducts and hydraulic means for opposing the action of the centrifugal means to prevent locking of the second planetary gear set or unlocking the same.

FREDERICK W. SEYBOLD.